United States Patent
Suzuki et al.

(10) Patent No.: US 10,603,925 B2
(45) Date of Patent: Mar. 31, 2020

(54) IMAGE-FORMING METHOD, IMAGE-FORMING APPARATUS, LASER IRRADIATION PRINTING INK, AND METHOD FOR MANUFACTURING OBJECT WITH FORMED IMAGE

(71) Applicants: Kazumi Suzuki, Shizuoka (JP); Masaki Yoshino, Kanagawa (JP)

(72) Inventors: Kazumi Suzuki, Shizuoka (JP); Masaki Yoshino, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/919,504

(22) Filed: Mar. 13, 2018

(65) Prior Publication Data

US 2018/0201027 A1    Jul. 19, 2018

Related U.S. Application Data

(63) Continuation of application No. PCT/JP2016/079685, filed on Oct. 5, 2016.

(30) Foreign Application Priority Data

Oct. 6, 2015    (JP) .................... 2015-198561

(51) Int. Cl.
*B41J 2/44* (2006.01)
*B41J 2/04* (2006.01)
(Continued)

(52) U.S. Cl.
CPC ............... *B41J 2/442* (2013.01); *B41J 2/04* (2013.01); *B41M 5/382* (2013.01); *B41M 5/46* (2013.01);
(Continued)

(58) Field of Classification Search
CPC ....... B41J 2/442; B41J 2/01; B41J 2/04; B41J 2/14161; G02B 5/003; C03C 8/02;
(Continued)

(56) References Cited

U.S. PATENT DOCUMENTS

| 5,021,808 A | 6/1991 | Kohyama |
| 6,357,868 B1 | 3/2002 | Pfaff et al. |

(Continued)

FOREIGN PATENT DOCUMENTS

| EP | 1 022 157 A2 | 7/2000 |
| EP | 2 965 904 A1 | 1/2016 |

(Continued)

OTHER PUBLICATIONS

Extended European Search Report dated Sep. 14, 2018 in European Patent Application No. 16853653.0, 7 pages.

(Continued)

*Primary Examiner* — Henok D Legesse
(74) *Attorney, Agent, or Firm* — Oblon, McClelland, Maier & Neustadt, L.L.P.

(57) ABSTRACT

A method for forming an image, the method including forming an image by irradiating an ink that absorbs light with a laser beam that has a wavelength corresponding to a light absorption wavelength of the ink to fly the ink by an energy of the laser beam in a direction in which the laser beam is emitted, to attach the ink on an attachment target.

11 Claims, 6 Drawing Sheets

(51) Int. Cl.
- *B41M 5/46* (2006.01)
- *C04B 41/86* (2006.01)
- *C09D 11/037* (2014.01)
- *C04B 41/00* (2006.01)
- *C03C 17/04* (2006.01)
- *C03C 8/14* (2006.01)
- *C03C 3/07* (2006.01)
- *C03C 8/16* (2006.01)
- *C04B 41/50* (2006.01)
- *B41M 5/382* (2006.01)
- *C03C 8/10* (2006.01)
- *C03C 8/02* (2006.01)
- *G02B 5/00* (2006.01)
- *B41M 5/00* (2006.01)
- *B41M 7/00* (2006.01)
- *B41M 5/385* (2006.01)
- *B41M 5/392* (2006.01)
- *B41J 2/14* (2006.01)

(52) U.S. Cl.
CPC ............ *C03C 3/07* (2013.01); *C03C 8/02* (2013.01); *C03C 8/10* (2013.01); *C03C 8/14* (2013.01); *C03C 8/16* (2013.01); *C03C 17/04* (2013.01); *C04B 41/009* (2013.01); *C04B 41/5022* (2013.01); *C04B 41/86* (2013.01); *C09D 11/037* (2013.01); *G02B 5/003* (2013.01); *B41J 2/14161* (2013.01); *B41M 5/007* (2013.01); *B41M 5/0052* (2013.01); *B41M 5/0058* (2013.01); *B41M 5/385* (2013.01); *B41M 5/392* (2013.01); *B41M 7/009* (2013.01); *B41M 2205/08* (2013.01); *C03C 2218/13* (2013.01)

(58) Field of Classification Search
CPC ......... C04B 41/86; B41M 5/46; B41M 5/382; C09D 11/037
See application file for complete search history.

(56) References Cited

U.S. PATENT DOCUMENTS

| | | | |
|---|---|---|---|
| 2005/0212888 A1 | 9/2005 | Lehmann et al. | |
| 2005/0264600 A1 | 12/2005 | Moffatt et al. | |
| 2011/0081551 A1* | 4/2011 | Koops | B41M 5/0052 428/432 |
| 2011/0195235 A1* | 8/2011 | Kato | C09B 57/004 428/195.1 |
| 2012/0091701 A1 | 4/2012 | Krueger et al. | |
| 2014/0226685 A1* | 8/2014 | Omatsu | G02F 1/39 372/23 |
| 2015/0239274 A1 | 8/2015 | Batt | |
| 2016/0107888 A1* | 4/2016 | Omatsu | B82Y 30/00 428/195.1 |
| 2016/0177113 A1* | 6/2016 | Allen | C09D 11/12 101/450.1 |
| 2017/0348872 A1* | 12/2017 | Suzuki | B29C 67/00 |

FOREIGN PATENT DOCUMENTS

| | | | | |
|---|---|---|---|---|
| JP | 62-184860 | | 8/1987 | |
| JP | 62-191157 | * | 8/1987 | ............... B41J 3/04 |
| JP | 62-191157 A | | 8/1987 | |
| JP | 08-118795 | | 5/1996 | |
| JP | 10-16392 | | 1/1998 | |
| JP | 11-245416 | | 9/1999 | |
| JP | 2000-214624 | | 8/2000 | |
| JP | 2001-039008 | | 2/2001 | |
| JP | 2001-081363 | | 3/2001 | |
| JP | 2005-518965 | | 6/2005 | |
| JP | 4210750 | | 11/2008 | |
| JP | 4368640 | | 9/2009 | |
| JP | 2009-536882 A | | 10/2009 | |
| JP | 2010-247230 | | 11/2010 | |
| JP | 2010-539704 A | | 12/2010 | |
| JP | 2014-172271 | | 9/2014 | |
| JP | WO2014181890 | * | 11/2014 | ............... G02B 5/30 |
| WO | WO 2012/169578 A2 | | 12/2012 | |
| WO | WO 2014/181890 A2 | | 11/2014 | |
| WO | 2015/068290 A1 | | 5/2015 | |
| WO | WO 2016/136722 A1 | | 9/2016 | |

OTHER PUBLICATIONS

International Search Report dated Nov. 15, 2016 for counterpart International Patent Application No. PCT/JP2016/079685 filed Oct. 5, 2016 (with English Translation).
Written Opinion dated Nov. 15, 2016 for counterpart International Patent Application No. PCT/JP2016/079685 filed Oct. 5, 2016.
Office Action dated Aug. 13, 2019 in Japanese Patent Application No. 2017-544541.
Combined Office Action and Search Report dated Feb. 2, 2019 in Chinese Patent Application No. 201680054012.X, 19 pages (with English translation).
Office Action dated Dec. 20, 2019 issued in corresponding European patent application No. 16 853 653.0.

* cited by examiner

IMAGE-FORMING METHOD, IMAGE-FORMING APPARATUS, LASER IRRADIATION PRINTING INK, AND METHOD FOR MANUFACTURING OBJECT WITH FORMED IMAGE

CROSS-REFERENCE TO RELATED APPLICATIONS

The present application is a continuation application of International Application No. PCT/JP2016/079685, filed Oct. 5, 2016, which claims priority to Japanese Patent Application No. 2015-198561, filed Oct. 6, 2015. The contents of these applications are incorporated herein by reference in their entirety.

BACKGROUND OF THE INVENTION

Field of the Invention

The present disclosure relates to a method for forming an image, an image forming apparatus, an ink for laser emission recording, and a method for producing an image formed object.

Description of the Related Art

Hitherto, image forming methods in an inkjet manner have been proposed as methods for forming images such as patterns onto surfaces of heat resistant substrates such as tiles and unglazed pottery and porcelain (see, e.g., Japanese Unexamined Patent Application Publication No. 2001-39008).

However, inks used in the inkjet manner need to have low viscosities due to fine nozzle-shaped structure of ejection units of inkjet heads and ejection methods of the inks. Therefore, components included in the inks and amounts of the components are limited, so that the components have low viscosities. As a result, media for adjusting concentrations of the components (dispersion media) are included in larger amounts. Therefore, problematically, it takes a long time to dry the inks and bleeding phenomena are likely to occur on surfaces of the heat resistant substrate.

If inorganic pigments having high specific gravity are used as the components, the inorganic pigments are likely to sediment and aggregate in the inks. Therefore, when the inorganic pigments are finely dispersed, for some of the inorganic pigments, images are deteriorated due to lower durability and significant color loss over time. Moreover, if the inorganic pigments have crystal shapes such as a needle-like shape or a scale-like shape, problematically, nozzle clogging occurs, making it difficult to stably form images.

Therefore, inks obtained by adding volatile dispersion media to aqueous inks have been proposed as methods for solving the problems regarding the bleeding phenomena and the nozzle clogging (see, e.g., Japanese Unexamined Patent Application Publication No. 2001-81363).

SUMMARY OF THE INVENTION

According to one aspect of the present disclosure, a method for forming an image includes forming an image by irradiating an ink that absorbs light with a laser beam that has a wavelength corresponding to a light absorption wavelength of the ink to fly the ink by an energy of the laser beam in a direction in which the laser beam is emitted, to attach the ink on an attachment target.

DESCRIPTION OF THE EMBODIMENTS (Image Forming Method and Image Forming Apparatus)

An image forming method of the present disclosure includes an image forming step, preferably includes a firing step, and, if necessary, further includes other steps.

An image forming apparatus of the present disclosure include an image forming unit, preferably includes a firing unit, and, if necessary, further includes other units.

The image forming method of the present disclosure may be performed using the image forming apparatus of the present disclosure.

The image forming apparatus of the present disclosure will now be described in detail through the description of the image forming method of the present disclosure.

The present disclosure has an object to provide an image forming method which enables efficient production of a high-quality image formed object causing fewer bleeding phenomena and having an excellent scratching resistance, an excellent peeling resistance, a good dot graininess, and a good stability of an ink attached amount.

The present disclosure can provide an image forming method which enables efficient production of a high-quality image formed object causing fewer bleeding phenomena during image formation and having an excellent scratching resistance, an excellent peeling resistance, a good dot graininess, and a good stability of an ink attached amount.

<Image Forming Step and Image Forming Unit>

The image forming step is a step of irradiating an ink that absorbs light with a laser beam that has a wavelength corresponding to a light absorption wavelength of the ink to fly the ink by an energy of the laser beam in a direction in which the laser beam is emitted, to attach the ink on an attachment target. The image forming step may be suitably performed using the image forming unit.

The image forming unit includes at least a laser light source, preferably includes an optical vortex converting portion, and, if necessary, further includes other members.

The ink may be hereinafter referred to as "ink for laser emission recording."

—Laser Light Source—

The laser light source is not particularly limited and may be appropriately selected depending on the intended purpose, so long as the laser light source generates the laser beam that has a wavelength corresponding to the light absorption wavelength of the ink. Examples of the laser light source include a solid-state laser, a gas laser, and a semiconductor laser, which generate the laser beam.

Examples of the solid-state laser include a YAG laser and a titanium-sapphire laser.

Examples of the gas laser include an argon laser, a helium neon laser, and a carbon dioxide laser.

Examples of the semiconductor laser include those made of, for example, GaAs or InGaAsP.

Among these lasers, a laser light source capable of oscillating pulses is preferable. The semiconductor laser having an output of about 30 mW is more preferable in terms of downsizing and cost-saving of the apparatus. However, in Examples, a titanium-sapphire laser was used experimentally.

The laser light source may be a laser light source that can output an optical vortex laser beam described below.

The wavelength of the laser beam is not particularly limited and may be appropriately selected depending on the intended purpose, but is preferably 300 nm or greater but 11 µm or less and more preferably 350 nm or greater but 1,100 nm or less. The wavelength of the laser beam in the preferable range is advantageous in that the ink may be flown at a high energy efficiency.

The beam diameter of the laser beam is not particularly limited and may be appropriately selected depending on the intended purpose, but is preferably 10 µm or greater but 10 mm or less and more preferably 10 µm or greater but 1 mm or less. The wavelength of the laser beam in the preferable range is advantageous in that images may be expressed more clearly.

The pulse width of the laser beam is not particularly limited and may be appropriately selected depending on the intended purpose, but is preferably 2 nanoseconds or longer but 100 nanoseconds or shorter and more preferably 2 nanoseconds or longer but 10 nanoseconds or shorter. The pulse width of the laser beam in the preferable range is advantageous in that the ink may be flown at a high energy efficiency.

The pulse frequency of the laser beam is not particularly limited and may be appropriately selected depending on the intended purpose, but is preferably 10 Hz or higher but 200 Hz or lower and more preferably 20 Hz or higher but 100 Hz or lower. The pulse width of the laser beam in the preferable range is advantageous in that dot shapes are stabilized because image forming efficiency is improved and fewer flowing ink droplets are further irradiated with the laser beam.

The laser beam to be emitted to the ink is not particularly limited and may be appropriately selected depending on the intended purpose. Examples of the laser beam include a typical laser beam of which light intensities are distributed according to Gaussian distribution and an optical vortex laser beam. Among these laser beams, the optical vortex laser beam is preferable.

The typical laser beam may be converted to the optical vortex laser beam at the optical vortex converting portion.

—Optical Vortex Converting Portion—

The optical vortex converting portion is not particularly limited and may be appropriately selected depending on the intended purpose, so long as the laser beam is converted to the optical vortex laser beam. Examples of the optical vortex converting unit include a diffractive optical element, a multimode fiber, and a liquid-crystal phase modulator.

Examples of the diffractive optical element include a spiral phase plate and a hologram element.

The method for generating the optical vortex laser beam is not limited to the method using the optical-vortex converting portion, and other examples include a method of oscillating an optical vortex from a laser oscillator as an eigenmode, a method of inserting a hologram element in an oscillator, a method of using excitation light converted to a doughnut beam, a method of using a resonator mirror having a scotoma, and a method of oscillating an optical vortex mode utilizing a thermal lens effect generated by a side-pumped solid-state laser as a spatial filter.

In order to stabilize the output of the optical vortex laser beam, it is preferable to arrange a quarter wave plate on the light path downstream of the optical vortex converting portion and set the optical axis of the quarter wave plate at an angle of +45 degrees from the optical vortex laser beam, which is linearly-polarized light, to convert the optical vortex laser beam to circularly-polarized light.

Figure 1A:
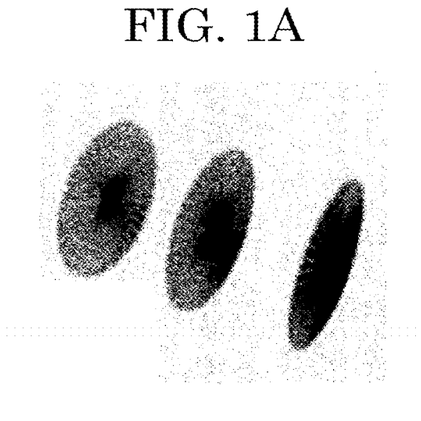
FIG. 1A is a schematic diagram illustrating an example of wave surfaces (equiphase surfaces) of a typical laser beam.
Figure 1B:
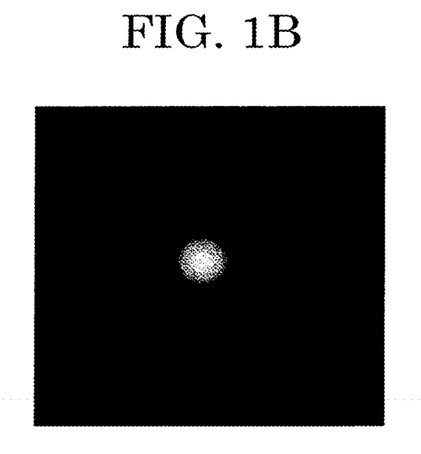
FIG. 1B is a diagram illustrating an example of a light intensity distribution of a typical laser beam.
Figure 1C:
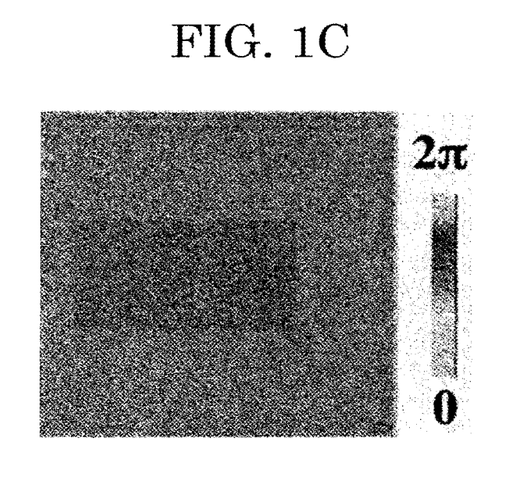
FIG. 1C is a diagram illustrating an example of a phase distribution of a typical laser beam.

The typical laser beam is uniform in phase, and hence has a flat equiphase surface (wave surface) as illustrated in FIG. 1A. The direction of the Poynting vector of the typical laser beam is a direction orthogonal to the flat equiphase surface. This direction is the same direction as an emission direction of the typical laser beam. Therefore, when the ink is irradiated with the typical laser beam, a force acts in the ink in the direction in which the typical laser beam is emitted. However, because the light intensity distribution in a cross-section of the typical laser beam is a normal distribution (Gaussian distribution) in which the center of the beam has the maximum intensity as illustrated in FIG. 1B, the ink tends to scatter. Further, when the phase distribution is observed, it can be confirmed that there is no phase difference, as illustrated in FIG. 1C.

Figure 2A:
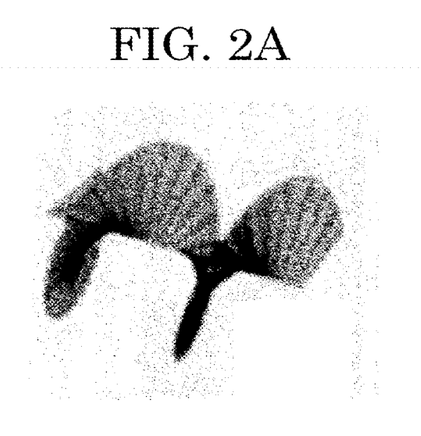
FIG. 2A is a schematic diagram illustrating an example of wave surfaces (equiphase surfaces) of an optical vortex laser beam.
Figure 2B:
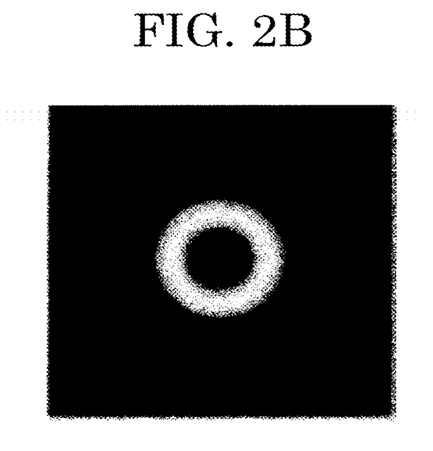
FIG. 2B is a diagram illustrating an example of a light intensity distribution of an optical vortex laser beam.

As compared, the optical vortex laser beam has a spiral equiphase surface as illustrated in FIG. 2A. The direction of the Poynting vector of the optical vortex laser beam is a direction orthogonal to the spiral equiphase surface. Therefore, when the ink is irradiated with the optical vortex laser beam, a force acts in the orthogonal direction. Therefore, the light intensity distribution is a recessed doughnut-shaped distribution in which the center of the beam is zero as illustrated in FIG. 2B. When the ink that is irradiated with the optical vortex laser beam, the doughnut-shaped energy is applied as a radiation pressure to the ink. At the same time, the so-called gyro effect is also imparted to the ink. Therefore, the ink is flown, like a rifle ball, along the direction in which the optical vortex laser beam is emitted, and attached in a not-easily-scatterable state on the attachment target.

Figure 2C:
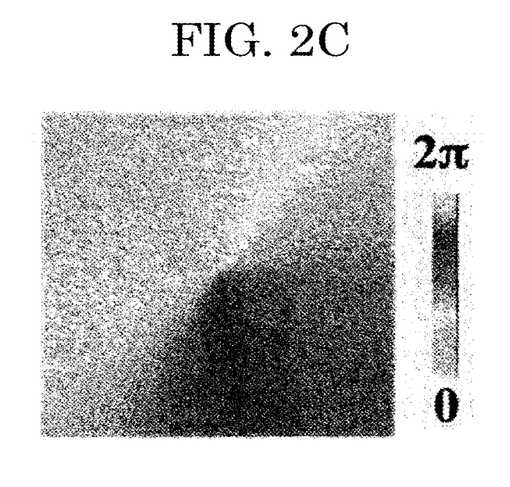
FIG. 2C is a diagram illustrating an example of a phase distribution of an optical vortex laser beam.

Further, when the phase distribution is observed, it can be confirmed that a phase difference occurs, as illustrated in FIG. 2C.

A method for judging whether a laser beam is the optical vortex laser beam or not is not particularly limited and may be appropriately selected depending on the intended purpose. Examples of the method include observation of the phase distribution described above and interferometry. The interferometry is common.

Figure 3A:
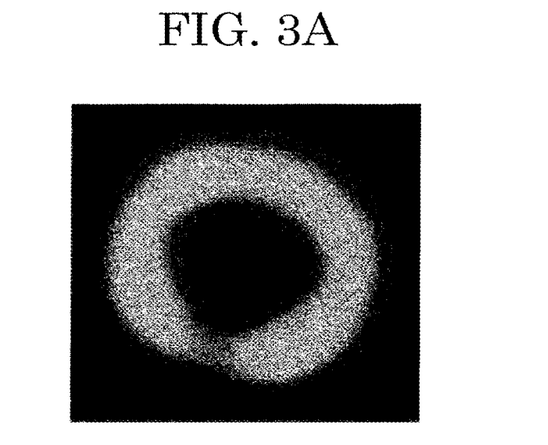
FIG. 3A is a diagram illustrating an example of a result of interferometry of an optical vortex laser beam.

The interferometry is possible with a laser beam profiler (e.g., a laser beam profiler available from Spiricon, Inc. and a laser beam profiler available from Hamamatsu Photonics K.K.). An example of a result of interferometry of an optical vortex laser beam using the laser beam profiler is illustrated in FIG. 3A. An example of a result of interferometry of a laser beam having a point at which a light intensity is 0 in the center using the laser beam profiler is illustrated in FIG. 3B.

FIG. 3A is a diagram illustrating an example of a result of interferometry of an optical vortex laser beam. FIG. 3B is a diagram illustrating an example of a result of interferometry of a laser beam having a point at which a light intensity is 0 in the center.

When the optical vortex laser beam is measured by interferometry, as illustrated in FIG. 3A, it can be confirmed that the optical vortex laser beam is a laser beam having a doughnut-shaped energy distribution and having a point at which a light intensity is 0 in the center as in FIG. 1C.

Figure 3B:
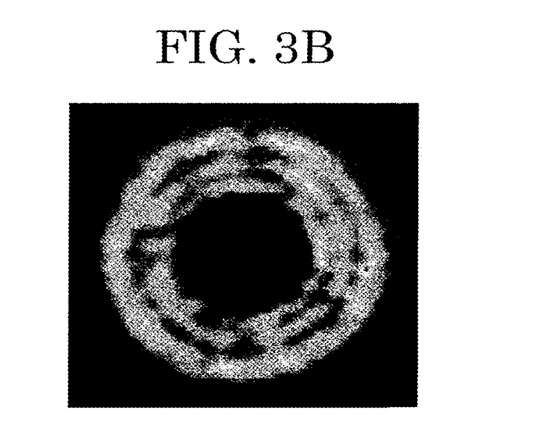
FIG. 3B is a diagram illustrating an example of a result of interferometry of a laser beam having a point at which a light intensity is 0 in the center.

On the other hand, when a typical laser beam having a point at which a light intensity is 0 in the center is measured by interferometry, as illustrated in FIG. 3B, the typical laser beam has an energy distribution which is similar to the interferometry of the optical vortex laser beam illustrated in FIG. 3A, but is not uniform in the doughnut-shaped portion. Thus, the difference from the optical vortex laser beam can be confirmed.

—Attachment Target—

The attachment target is not particularly limited and may be appropriately selected depending on the intended purpose, but is preferably a heat resistant substrate. The attachment target of the heat resistant substrate is advantageous in that the heat resistant substrate may be fired after the ink is attached on the heat resistant substrate.

The heat resistant substrate is not particularly limited and may be appropriately selected depending on the intended purpose, so long as the heat resistant substrate can withstand a firing method described below. Examples of the heat resistant substrate include a tile, glass, unglazed pottery and porcelain, pottery and porcelain, and enamel.

—Other Members—

The other members are not particularly limited and may be appropriately selected depending on the intended purpose. Examples of the other members include a beam diameter changing member, a beam wavelength changing element, and an energy adjusting filter.

—Beam Diameter Changing Member—

The beam diameter changing member is not particularly limited and may be appropriately selected depending on the intended purpose, so long as the beam diameter changing member can change the beam diameter of the laser beam. Examples of the beam diameter changing member include a condenser lens.

The beam diameter of the optical vortex laser beam is not particularly limited and may be appropriately selected depending on the intended purpose, but is preferably several micrometers or greater but 10 mm or less because the ink has been confirmed to be flown at such a beam diameter. The beam diameter can be changed by a laser spot diameter and a condenser lens.

When a dispersion is included in the ink, the beam diameter is preferably greater than or equal to the maximum volume average particle diameter of the dispersion and more preferably 3 times as large as the maximum of the dispersion. The beam diameter in the more preferable range is advantageous in that the ink can be flown stably.

—Beam Wavelength Changing Element—

The beam wavelength changing element is not particularly limited and may be appropriately selected depending on the intended purpose, so long as the beam wavelength changing element can change the wavelength of the laser beam to a wavelength that can be absorbed by the ink and to which an ink bearer described below is transparent. Examples of the beam wavelength changing element include a KTP crystal, a BBO crystal, a LBO crystal, and a CLBO crystal.

—Energy Adjusting Filter—

The energy adjusting filter is not particularly limited and may be appropriately selected depending on the intended purpose, so long as the energy adjusting filter can adjust the laser beam to an appropriate output value. Examples of the energy adjusting filter include an ND filter and a glass plate.

The energy intensity of the laser beam for flying the ink corresponding to 1 dot is not particularly limited and may be appropriately selected depending on the intended purpose, but is preferably, 0.1 mJ/dot or greater but 3.0 mJ/dot or less and more preferably 0.2 mJ/dot or greater but 1.5 mJ/dot or less.

<Firing Step and Firing Unit>

The firing step is a step of firing the ink attached on the attachment target and may be performed by the firing unit.

The firing unit is a unit configured to fire the ink attached on the attachment target.

The firing unit is not particularly limited and may be appropriately selected depending on the intended purpose. Examples of the firing unit include an electric furnace and a gas furnace. The attachment target is preferably the heat resistant substrate.

—Firing Method—

A method for firing the ink attached on the heat resistant substrate is not particularly limited and may be appropriately selected depending on the intended purpose. Examples of the method include a method in which the ink is fired in a region adjacent to a surface of the heat resistant substrate and a method in which the ink is fired in a region deeper from a surface of the heat resistant substrate.

Examples of the method in which the ink is fired in a region adjacent to a surface of the heat resistant substrate include a method in which a temperature is gradually increased from room temperature at a temperature gradient of about 200° C./1 hour, kept in a temperature range of 750° C. or higher but 850° C. or lower for 30 min or longer but 1 hour or shorter, and then naturally decreased to room temperature. When this method is used, a glaze frit is melted to allow the inorganic pigment included in the ink to be fired on the surface of the heat resistant substrate. As a result, an image formed object of the heat resistant substrate on which an image is formed without white spots or uneven firing can be obtained.

Examples of the method in which the ink is fired in a region deeper from a surface of the heat resistant substrate includes a method in which a temperature is gradually increased from room temperature at a temperature gradient of about 200° C./1 hour, kept in a temperature range of 1,100° C. or higher but 1,300° C. or lower for 30 min or longer but 1 hour or shorter, and then naturally decreased to room temperature.

A temperature at which heating is initiated is not particularly limited and may be appropriately selected depending on the intended purpose. The temperature is not limited to room temperature.

A temperature gradient during heating or cooling is not particularly limited and may be appropriately selected depending on the intended purpose, but is preferably 100° C./1 hour or greater but 300° C./1 hour or less. The temperature gradient in the preferable range is advantageous in that failures such as cracks and shape change are prevented from occurring in the heat resistant substrate.

A temperature gradient during baking of the ink is preferably 50° C./1 hour or greater but 500° C./1 hour or less. The temperature gradient in the preferable range is advantageous in that baking efficiency is improved and failures such as cracks and shape change are less likely to occur in the heat resistant substrate.

<Other Steps and Other Units>

Examples of the other steps include an ink supplying step, a beam scanning step, an attachment target conveying step, and a controlling step.

Examples of the other units include an ink supplying unit, a beam scanning unit, an attachment target conveying unit, and a controlling unit.

The image forming unit, the ink bearer, the ink supplying unit, and the beam scanning unit may be handled integrally as a laser beam emitting unit.

—Ink Supplying Step and Ink Supplying Unit—

The ink supplying step is not particularly limited and may be appropriately selected depending on the intended purpose, so long as the ink supplying step is a step of supplying the ink to the light path of the laser beam between the image forming unit and the attachment target. The ink supplying step can be suitably performed by, for example, the ink supplying unit.

The ink supplying unit is not particularly limited and may be appropriately selected depending on the intended purpose, so long as the ink supplying unit can supply the ink to the light path of the laser beam between the image forming unit and the attachment target. For example, the ink may be supplied using an ink bearer. The image forming unit preferably irradiates the ink borne on one surface of the ink bearer with the laser beam from the other surface of the ink bearer.

The ink bearer is not particularly limited and may be appropriately selected depending on the intended purpose, so long as the ink bearer can be transparent to light including the laser beam.

The ink bearer may be, for example, flat plate-shaped or cylindrical.

For the ink supplying unit, specifically, when the ink is a liquid and the ink is supplied onto the ink bearer, a supplying roller and a regulating blade may be provided as the ink supplying unit, making it possible to supply the ink onto one surface of the ink bearer so as to have a constant average thickness with a very simple configuration with fewer members.

In the case of such a configuration, a preferable aspect is an aspect in which the supplying roller has a surface partially immersed in a storage tank storing the ink, rotates while bearing the ink on the surface, and comes to abut on the ink bearer to supply the ink onto the ink bearer. The regulating blade is arranged downstream of the storage tank and upstream of the ink bearer in the rotation direction of the supplying roller, making it possible to regulate the ink borne on the supplying roller to make the average thickness uniform and stabilize the amount of the ink to be flown. By making the average thickness of the ink very thin, it is possible to decrease the amount of the ink to be flown. This makes it possible to attach the ink on the attachment target as scattering-suppressed minute dots and to suppress dot gain which is thickening of halftone dots. The regulating blade may be arranged downstream of the supplying roller in the rotation direction of the ink bearer.

When the ink has a high viscosity, it is preferable that the material of the supplying roller have elasticity in at least the surface, in order to ensure contact with the ink bearer. When the ink has a relatively low viscosity, a gravure roll, microgravure, and a forward roll as used in precision wet coating are preferably used as the supplying roller.

Furthermore, when not provided with the supplying roller, the ink supplying unit may bring the ink bearer into direct contact with the ink in the storage tank, and then scrape off an excessive amount of the ink with, for example, a wire bar, to form a layer of the ink on one surface of the ink bearer. The storage tank may be provided separately from the ink supplying unit, so the ink may be supplied to the ink supplying unit through, for example, a hose.

—Beam Scanning Step and Beam Scanning Unit—

The beam scanning step is not particularly limited and may be appropriately selected depending on the intended purpose, so long as the beam scanning step is a step of scanning the laser beam on, for example, the ink bearer configured to bear the ink. The beam scanning step can be suitably performed by, for example, the beam scanning unit.

The beam scanning unit is not particularly limited and may be appropriately selected depending on the intended purpose, so long as the beam scanning unit can scan the laser beam on, for example, the ink bearer configured to bear the ink. For example, the beam scanning unit may include a reflecting mirror configured to reflect the laser beam emitted by the image forming unit toward the ink, and a reflecting mirror driving portion configured to change the angle and position of the reflecting mirror to scan the laser beam on the ink.

—Attachment Target Conveying Step and Attachment Target Conveying Unit—

The attachment target conveying step is not particularly limited and may be appropriately selected depending on the intended purpose, so long as the attachment target conveying step is a step of conveying the attachment target. The attachment target conveying step can be suitably performed by, for example, the attachment target conveying unit.

The attachment target conveying unit is not particularly limited and may be appropriately selected depending on the intended purpose, so long as the attachment target conveying unit can convey the attachment target. Examples of the attachment target conveying unit include a pair of conveying rollers.

—Controlling Step and Controlling Unit—

The controlling step is a step of controlling each of the steps, and can be suitably performed by the controlling unit.

The controlling unit is not particularly limited and may be appropriately selected depending on the intended purpose, so long as the controlling unit can control the operations of each unit. Examples of the controlling unit include devices such as a sequencer and a computer.

(Ink for Laser Emission Recording)

An ink for laser emission recording of the present disclosure is not particularly limited and may be appropriately selected depending on the intended purpose, so long as the ink for laser emission recording is an ink that absorbs light, is irradiated with a laser beam that has a wavelength corresponding to a wavelength of the light to fly, and has a viscosity of 2 Pa·s or higher but 100 Pa·s or lower. The ink for laser emission recording includes at least a colorant, preferably includes a dispersion medium and an organic binder, and, if necessary, further includes other components.
<Colorant>

The colorant is not particularly limited and may be appropriately selected depending on the intended purpose, but preferably includes at least one of an inorganic pigment and a glaze frit.

—Inorganic Pigment—

The inorganic pigment is not particularly limited and may be appropriately selected depending on the intended purpose. Examples of the inorganic pigment include a pigment for the ceramic industry, the pigment developing a color after the firing step.

Examples of the pigment for the ceramic industry include oxides of elements belonging to Group 1 (Cu, Ag, and Au), Group 2 (Cd), Group 4 (Ti), Group 5 (V and Sb), Group 6 (Se, Cr, Mo, W, and U), Group 7 (Mn), and Group 8 (Fe, Co, Ni, Ir, and Pt) of the periodic table.

Specific examples of the pigment for the ceramic industry include titanium oxide, zinc oxide, black iron oxide, black copper oxide, black chromium oxide, yellow iron oxide, yellow nickel titanium, cadmium sulfide, selenium, cadmium selenide, lead chromate, lead molybdate, red iron oxide, cobalt oxide, hydrous chromium oxide, chromium oxide, gold, antimonial lead, nickel oxide, manganese oxide, neodymium oxide, erbium oxide, cerium oxide, aluminium oxide, aluminium, bronze, mica, carbon black, calcium carbonate, barium sulfate, zinc oxide, antimony trioxide, mercury cadmium sulfide, Prussian blue, and ultramarine blue.

These may be used alone or in combination. These may be formed into mixtures, double salts, or complex salts.

—Glaze Frit—

The glaze fit is not particularly limited and may be appropriately selected depending on the intended purpose. Examples of the glaze Mt include hydroxides of alkali metals or alkaline earth metals, carbonates of alkali metals or alkaline earth metals, chlorides of alkali metals or alkaline earth metals, borates of chlorides of alkali metals or alkaline earth metals, metaborates of chlorides of alkali metals or alkaline earth metals, phosphates of alkali metals or alkaline earth metals, pyrophosphates of alkali metals or alkaline earth metals, silicates of alkali metals or alkaline earth metals, metasilicates of alkali metals or alkaline earth metals, aluminium chloride, boric acid, metal oxides, metal fluorides, and glasslets.

These may be used alone or in combination.

Examples of the hydroxides of alkali metals or alkaline earth metals include lithium hydroxide.

Examples of the carbonates of alkali metals or alkaline earth metals include lithium carbonate.

Examples of the metal oxides include zirconium silicate, bone ash, borax, ammonium metavanadate, tungsten oxide, vanadium pentoxide, tin oxide, zirconium oxide, cerium oxide, and molybdenum oxide.

Examples of the metal fluorides include calcium fluoride and aluminium fluoride.

Examples of a method for incorporating the glaze frit into the colorant include a method in which the inorganic pigment is mixed with the glaze frit and a method in which a mixture of the inorganic pigment and the glaze frit is heat-melted, cooled, and then ground.

Among these methods, a preferable method is a method in which the inorganic pigment, which is obtained by alloying a plurality of metals, and the glaze frit are mixed in the predetermined amounts, heat-melted at a temperature range of 650° C. or higher but 800° C. or lower, cooled, and then ground. Incorporating the glaze frit into the colorant by such a method is advantageous in that clear full-color ink images having a high image density can be baked on a surface of the heat resistant substrate such as a ceramic industrial product.

A mass ratio of the inorganic pigment to the glaze frit (inorganic pigment/glaze frit) in the colorant is preferably 2/8 or higher but 6/4 or lower and more preferably 3/7 or higher but 5/5 or lower. The mass ratio in the preferable range is advantageous in that the degree of pigmentation of the ink is less likely to be low and a pattern baked on a surface of the heat resistant substrate is suppressed from peeling from the surface of the heat resistant substrate.

The glaze frit serves to sinter the inorganic pigment in the ink on the surface of the heat resistant substrate in the firing step. The glaze frit turns into a melted or semi-melted state during firing but is formed into a cured film when cooled to room temperature.

A volume average particle diameter of a dispersion including at least one of the inorganic pigment and the glaze frit in the colorant is not particularly limited and may be appropriately selected depending on the intended purpose, but is preferably 0.1 µm or greater but 100 µm or less and more preferably 1 µm or greater but 25 µm or less. The volume average particle diameter of the dispersion in the preferable range is advantageous in that the formed image is suppressed from degrading over time.

The volume average particle diameter smaller than a laser spot diameter of the laser beam is advantageous in terms of stabilized dot graininess.

Examples of a method of enhancing a bond of the glaze fit to the heat resistant substrate include a method using those obtained by mixing for example, feldspars, natural minerals, barium carbonate, zinc oxide, or strontium carbonate with the glaze frit in advance and then dissolving.

Examples of the feldspars include lime feldspar, potassium feldspar, albite, and petalite (lithium feldspar).

Examples of the natural minerals include kaolin, silicastone, alumina, silica, quartz, titanium oxide, lead oxide, chamotte, soil ash, limestone, magnesite, talc, and dolomite.

<Dispersion Medium>

The dispersion medium is not particularly limited and may be appropriately selected depending on the intended purpose, so long as the dispersion medium allows the inorganic pigment and the glaze frit to disperse into the ink. Examples of the dispersion medium include water, organic solvents, waxes, and resin varnish. These may be used alone or in combination. Among these dispersion medium, water is preferable from the viewpoint of safety of volatile components and no risk of explosion. The dispersion medium may be mixed with, for example, a surfactant or a dispersing agent.

The organic solvents are not particularly limited and may be appropriately selected depending on the intended purpose. Examples of the organic solvents include hydrocarbon-based organic solvents and various alcohols.

The waxes are not particularly limited and may be appropriately selected depending on the intended purpose. Examples of the waxes include hydrocarbon-based waxes, ester waxes, and ketone waxes.

The resin varnish is not particularly limited and may be appropriately selected depending on the intended purpose. Examples of the resin varnish include acrylic resin varnish, polyester resin varnish, styrene resin varnish, polyurethane resin varnish, alkyd resin varnish, epoxy resin varnish, amber resin varnish, and rosin resin varnish.

The surfactant is not particularly limited and may be appropriately selected depending on the intended purpose. Examples of the surfactant include anionic surfactants, cationic surfactants, nonionic surfactants, and amphoteric surfactants.

Examples of the anionic surfactants include fatty acid soaps, alkyl succinates, sodium alkylbenzene sulfonate, sodium alkyl naphthalene sulfonate, sodium salts of alkyl sulfuric acid esters, sodium polyoxyethylene alkylether sulfate, sodium dialkyl sulfosuccinate, sodium alkyl phosphate, and polycarboxylic acid-based polymeric surfactant. In addition to the above-described sodium salts, for example, any metal salts and ammonium salts may be used.

Examples of the cationic surfactant include alkyltrimethylammonium chloride and alkyldimethylbenzylammonium chloride.

Examples of the nonionic surfactant include polyoxyethylene alkylether, polyoxyethylenealkylallylether, and sorbitan fatty acid esters.

Examples of the amphoteric surfactant include alkyl betaine and amide betaine.

<Organic Binder>

When the organic binder is included in the ink, the inorganic pigment and the glaze fit can be kept in a more stably dispersed state in the ink.

The organic binder is not particularly limited and may be appropriately selected depending on the intended purpose. Examples of the organic binder include natural polymers, semi-synthetic polymers, and synthetic polymers.

Examples of the natural polymers include starches, natural rubbers, vegetable proteins, seaweeds, casein, and gelatin.

Examples of the semi-synthetic polymer include ether cellulose, ester cellulose, ether starches, ester starches, and modified natural rubbers.

Examples of the synthetic polymer include polyvinyl alcohols, polyethylene glycol, polyvinyl acetate, polyvinyl butyrate resins, polyvinyl acrylate resins, polyvinylmethyl resins, cross-linked polyacrylic acid, sodium polyacrylate, polyacrylic ester, polyacrylamide, sodium methacrylate, polybutadiene, polyurethane, polyester, and polylactic acid.

These may be used alone or in combination.

Among them, water-soluble or water-dispersible organic polymers are preferable, and organic binders including no metal atom in molecular structure of the organic binders are more preferable. The organic binders including no metal atom in molecular structure of the organic binders are advantageous in that oxidization of the metal atom during firing is less likely to impair transparency of an ink received layer.

An amount of the organic binder is not particularly limited and may be appropriately selected depending on the intended purpose, but is preferably 0.1 parts by mass or greater but 10 parts by mass or less relative to 100 parts by mass of a total mass of the inorganic pigment and the glaze frit.

<Other Components>

The other components are not particularly limited and may be appropriately selected depending on the intended purpose. Examples of the other components include a heat stabilizer, an antioxidant, a reduction inhibitor, a preservative, a pH adjusting agent, an anti-foaming agent, a wetting agent, and a permeation agent.

The ink can be obtained by mixing these materials, dispersing the resultant mixture using a disperser such as a roll mill, a ball mill, a colloid mill, a jet mill, and a bead mill, and then filtering.

A viscosity of the ink is not particularly limited and may be appropriately selected depending on the intended purpose, but is preferably 1 Pa-s or higher but 300 Pa-s or lower and more preferably 2 Pa-s or higher but 100 Pa-s or lower. The viscosity in the preferable range is advantageous in that the ink is less likely to splash or scatter when the ink is attached on the surface of the heat resistant substrate and the bleeding phenomenon is less likely to occur when an ink having another color is superposed. That is also advantageous in that the inorganic pigment and the glaze frit, which have particularly high specific gravity among the colorants included in the ink, are less likely to sediment or aggregate and it becomes easy to continuously supply the ink in the form of a layer having a constant average thickness.

The viscosity may be measured under an environment of 25° C. using, for example, a rotational viscometer (VISCOMATE VM-150III, available from Told Sangyo Co., Ltd).

(Method for Producing Image Formed Object)

A method for producing an image formed object of the present disclosure is a method for producing an image formed object which has an image formed by an image forming method of the present disclosure on a surface of the attachment target. The attachment target is not particularly limited and may be appropriately selected depending on the intended purpose, but is preferably the heat resistant substrate.

<Image Formed Object>

Examples of the image formed object include a tile, glass, unglazed pottery and porcelain, pottery and porcelain, and enamel with a pattern.

Specifically, pottery and porcelain such as a vase, a mug, and a small bowl can be produced by forming images with the ink on unglazed pottery and porcelain having the predetermined shape and firing. Moreover, glazed pottery and porcelain can be produced by forming images with the ink on pottery and porcelain and firing.

An example of the image forming apparatus of the present disclosure will now be described referring to the drawings.

The number, position, and shape of constituent members described below are not limited to the present embodiment, but may be changed to the number, position, and shape that are preferable for practicing the present disclosure.

Figure 4A:
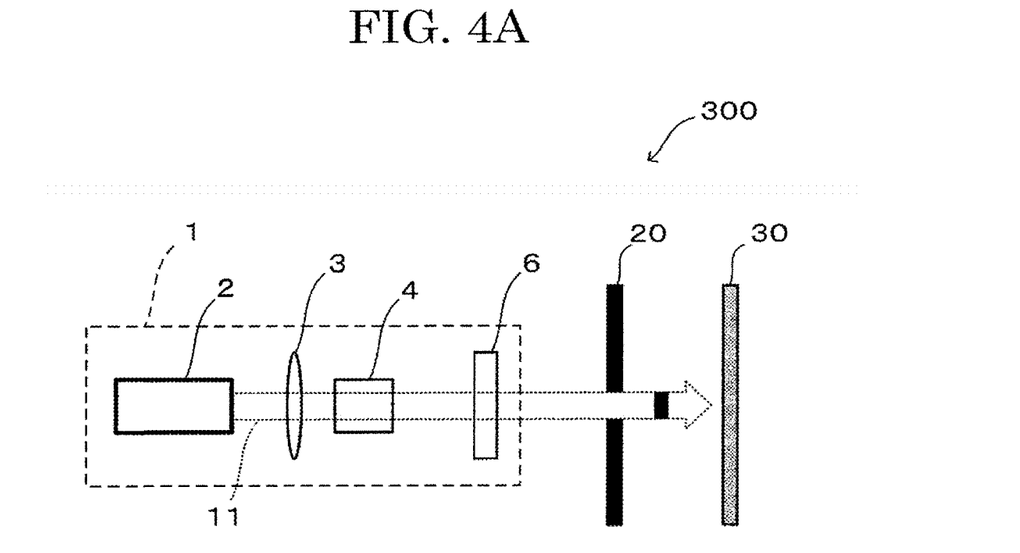
FIG. 4A is a schematic view illustrating an example of an image-forming apparatus of the present disclosure.

FIG. 4A is a schematic view illustrating an example of the image forming apparatus of the present disclosure.

In FIG. 4A, an image forming apparatus 300 includes an image forming unit 1, an ink 20, and an attachment target 30, and configured to allow the image forming unit 1 to irradiate the ink 20 that absorbs light with a laser beam 11 of the light, to fly the ink 20 by the energy of the laser beam 11 in the direction in which the laser beam is emitted, to attach the ink on the attachment target 30.

The image forming unit 1 includes a laser light source 2, a beam diameter changing unit 3, a beam wavelength changing unit 4, and an energy adjusting filter 6.

The laser light source 2 is, for example, a titanium-sapphire laser, and is configured to generate a pulse oscillated laser beam 11 and irradiate the beam diameter changing unit 3 with the laser beam 11.

The beam diameter changing unit 3 is, for example, a condenser lens, is arranged downstream of the laser light source 2 on the light path of the laser beam 11 generated by the laser light source 2, and is configured to change the diameter of the laser beam 11.

The beam wavelength changing unit 4 is, for example, a KTP crystal, is arranged downstream of the beam diameter changing unit 3 on the light path of the laser beam 11, and is configured to change the wavelength of the laser beam 11 to a wavelength that can be absorbed by the ink 20.

The energy adjusting filter 6 is formed of, for example, glass through which the transmittance of the laser beam 11 is low, is arranged downstream of the beam wavelength changing unit 4 on the light path of the laser beam 11, and is configured to change the energy of the laser beam 11 that has passed through the energy adjusting filter to an adequate energy for flying the ink 20.

The ink 20 is irradiated with the laser beam 11 that has passed through the energy adjusting filter 6, flies upon application of the energy within the range of the diameter of the laser beam 11, and attaches on the attachment target 30. When the laser beam 11 is the optical vortex laser beam, the flown ink 20 attaches on the attachment target 30 while being suppressed from scattering around by a gyro effect imparted by the optical vortex laser beam.

Here, an amount of the ink 20 to be attached corresponds to a part or the whole of the area of the ink 20 irradiated with the laser beam 11, and can be adjusted by, for example, the energy adjusting filter 6.

Figure 4B:
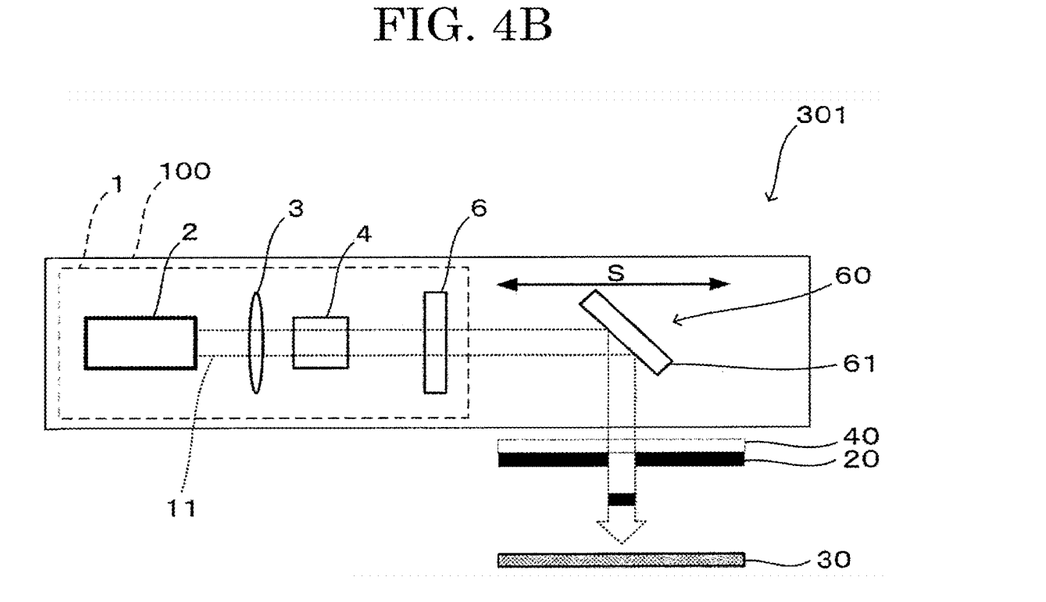
FIG. 4B is a schematic view illustrating another example of an image-forming apparatus of the present disclosure.

FIG. 4B is a schematic view illustrating another example of the image forming apparatus of the present disclosure.

In FIG. 4B, an image forming apparatus 301 includes an ink bearer 40 and a beam scanning unit 60 in addition to the units of the image forming apparatus 300 illustrated in FIG. 4A. The image forming apparatus 301 can allow the beam scanning unit 60 to scan the laser beam 11 generated by the image forming unit 1 in a direction orthogonal to the direction in which the laser beam 11 is emitted, to irradiate an arbitrary position of the ink 20 borne on the flat-plate-shaped ink bearer 40 with the laser beam 11 to fly the ink 20 and attach the flown ink 20 on the attachment target 30.

The beam scanning unit 60 is arranged downstream of the image forming unit 1 on the light path of the laser beam 11, and includes a reflecting mirror 61.

The reflecting mirror 61 is movable by an unillustrated reflecting mirror driving unit in the scanning direction indicated by an arrow S in FIG. 4B, and is configured to reflect the laser beam 11 to an arbitrary position of the ink 20 borne on the ink bearer 40.

The beam scanning unit 60 may be configured to scan the laser beam 11 to an arbitrary position, by, for example, moving the image forming unit 1 itself, pivoting the image forming unit 1 to change the direction in which the laser beam 11 is emitted, or using a polygon mirror as the reflecting mirror 61.

The ink bearer 40 is arranged downstream of the beam scanning unit 60 on the light path of the laser beam 11. For example, when the ink 20 is a liquid having a high viscosity, the ink bearer 40 is used for the purpose of immobilizing the ink 20 coated on the ink bearer. The ink bearer 40 is transparent to light including the laser beam 11, and is configured to bear the ink 20 on one surface of the attachment target 30. The ink 20 is irradiated with the laser beam 11 from the other surface.

By controlling a layer, which is to be formed of the ink 20, to have a constant average thickness at the stage of bearing the ink 20 on the ink bearer 40, it is possible to stabilize the amount of the ink 20 to be attached on the attachment target 30.

A combination of the image forming unit 1 and the beam scanning unit GO is referred to as a laser beam emitting unit 100.

Figure 5A:
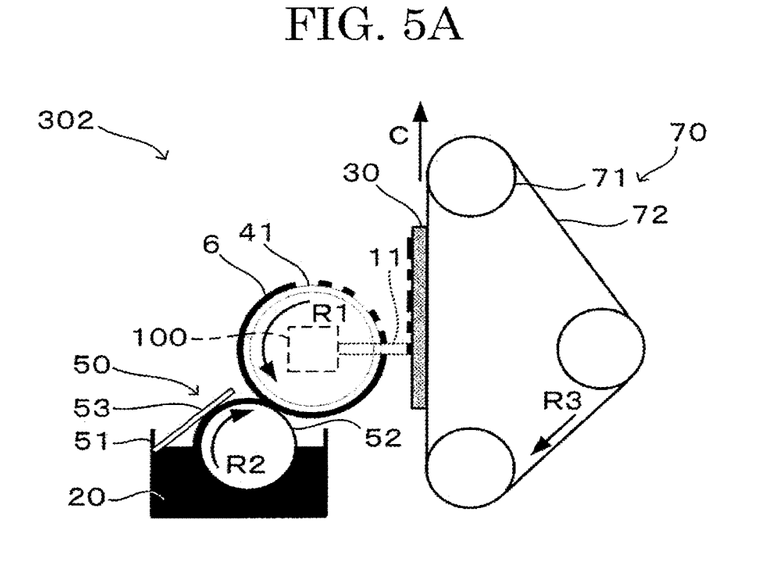
FIG. 5A is a schematic view illustrating an example of the image-forming apparatus that is illustrated in FIG. 4B and to which an ink supplying unit and an attachment target conveying unit are added.

FIG. 5A is a schematic view illustrating an example of the image forming apparatus that is illustrated in FIG. 4B and to which an ink supplying unit and an attachment target conveying unit are added.

In FIG. 5A, an image forming apparatus 302 includes an ink supplying unit 50 and an attachment target conveying unit 70 in addition to the units of the image forming apparatus 301 illustrated in FIG. 4B, and includes a cylindrical ink bearing roller 41 instead of the flat-plate-shaped ink bearer 40. The laser beam emitting unit 100 is arranged inside the ink bearing roller 41, and is configured to irradiate the attachment target 30 borne on the outer circumference of the ink bearing roller 41 with the laser beam 11.

The ink supplying unit 50 includes a storage tank 51, a supplying roller 52, and a regulating blade 53.

The storage tank 51 is arranged in the lower adjacency of the supplying roller 52, and is configured to store an ink 10.

The supplying roller 52 is arranged to abut on the ink bearing roller 41, is partially immersed in the ink 10 in the storage tank 51, and is configured to rotate in the rotation direction indicated by an arrow R2 in FIG. 5A by means of an unillustrated rotation driving unit or by following the rotation of the ink bearing roller 41 to make the ink 10 be attached on the surface. The attached ink 10 is regulated to a uniform average thickness by the regulating blade 53 and transferred onto the ink bearing roller 41 to be supplied in the form of a layer. The ink 10 supplied onto the surface of the ink bearing roller 41 is continuously supplied to the position that is irradiated with the laser beam 11 by the rotation of the ink bearing roller 41.

The regulating blade 53 is arranged upstream of the ink bearing roller 41 in the rotation direction indicated by the arrow R2 in the drawing, and is configured to regulate the ink 10 which has attached on the surface of the supplying roller 52 to make the average thickness of the layer of the ink 10 to be supplied onto the ink bearing roller 41 uniform.

The attachment target conveying unit 70 is arranged adjacent to the ink bearing roller 41 in a manner that the ink bearing roller 41 and the attachment target 30 to be conveyed are not brought into contact with each other, and includes an attachment target conveying roller 71 and an attachment target conveying belt 72 stretched on the attachment target conveying roller 71. The attachment target conveying unit 70 is configured to rotate the attachment target conveying roller 71 by means of an unillustrated rotation driving unit to convey the attachment target 30 by means of the attachment target conveying belt 72 in the conveying direction indicated by an arrow C in FIG. 5A.

The laser beam emitting unit 100 is configured to emit the laser beam 11 from inside the ink bearing roller 41 based on image information to attach the ink 20 on the attachment target 30. It is possible to form a two-dimensional image on the attachment target 30, by performing this attaching operation of attaching the ink 20 on the attachment target 30 while moving the attachment target 30 by means of the attachment target conveying belt 72.

The ink 20 that has been borne on the surface of the ink bearing roller 41 but has not been flown accumulates by the rotational abutting of the ink bearing roller 41 on the supplying roller 52 and eventually falls into the storage tank 51 to be collected. A method for collecting the ink 20 is not limited to the above, and, for example, a scraper configured to scrape off the ink 20 on the surface of the ink bearing roller 41 may be provided.

Figure 5B:
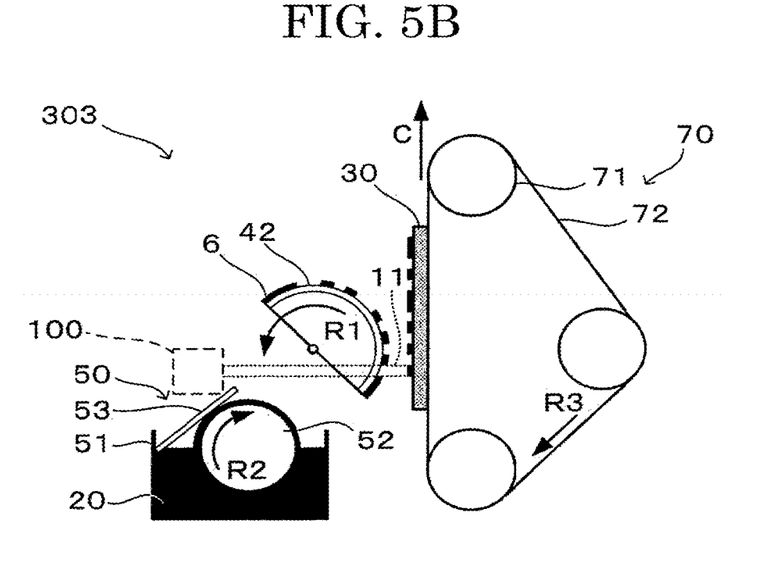
FIG. 5B is a schematic view illustrating another example of the image-forming apparatus that is illustrated in FIG. 4B and to which an ink supplying unit and an attachment target conveying unit are added.

FIG. 5B is a schematic view illustrating another example of the image forming apparatus that is illustrated in FIG. 4B and to which an ink supplying unit and an attachment target conveying unit are added.

In FIG. 5B, an image forming apparatus 303 is obtained by modifying the arrangement of the laser beam emitting unit 100, by dividing the cylindrical ink bearing roller 41 of the image forming apparatus 302 illustrated in FIG. 5A along the axial direction into 2 parts as an ink bearing portion 42.

The ink bearing portion 42 has a shape that is defined by a partial surface of a cylindrical shape and has no surface on the opposite side with respect to the center line of the cylinder. Such a bearing unit having no opposite surface can simplify the apparatus because the laser beam emitting unit 100 is not provided inside the cylindrical ink bearing roller 41 to make it easier to secure the light path of the laser beam 11.

Figure 5C:
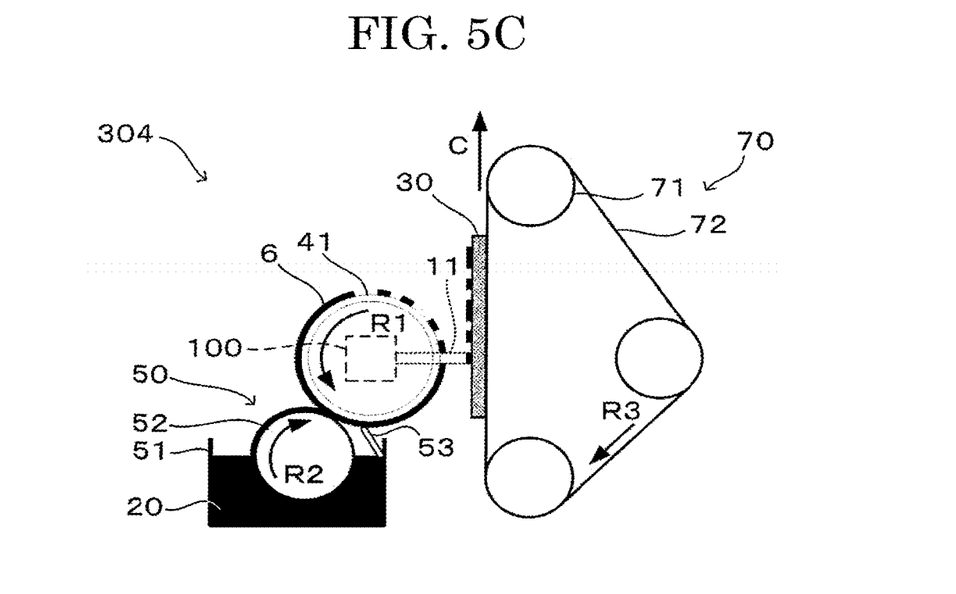
FIG. 5C is a schematic view illustrating another example of the image-forming apparatus that is illustrated in FIG. 4B and to which an ink supplying unit and an attachment target conveying unit are added.

FIG. 5C is a schematic view illustrating another example of the image forming apparatus that is illustrated in FIG. 4B and to which an ink supplying unit and an attachment target conveying unit are added.

In FIG. 5C, an image forming apparatus 304 is obtained by changing the position of the regulating blade 53 in the image forming apparatus 302 illustrated in FIG. 5A. The image forming apparatus 304 is preferable for use, particularly when the ink 20 is a powder.

The regulating blade 53 arranged near the ink bearing roller 41 is configured to regulate the bearing amount of the ink 20 supplied by the ink supplying unit 50 onto the ink bearing roller 41. This arrangement of the regulating blade 53 is the same as, for example, the arrangement of a regulating blade in a unit configured to supply a toner onto a developing roller in a typical electrophotographic one-component developing device.

When the ink 20 is a powder as in this case, the ink 20 attached on the surface of the attachment target 30 may be fixed on the attachment target 30 by a treatment such as pressurizing or heating.

The image forming apparatus in which the attachment target is conveyed or moved has been exemplified, but the image forming apparatus is not limited to the above. For example, the laser beam emitting unit may be moved while, for example, the attachment target is stopped, or both of the laser beam emitting unit and the attachment target may be moved.

For example, when forming an image on the entire surface of the attachment target simultaneously, it is possible to stop both and move only the laser at least during printing.

EXAMPLES

Examples of the present disclosure will now be described. The present disclosure is not limited to these Examples in any way.

Production Example 1

<Production of Glaze Frit>
$Al_2O_3$ (80 g), $SiO_2$ (370 g), $Na_2O$ (50 g), and PbO (500 g) were combined, ground using a stamp mill (ANS-143PL, available from NITTO KAGAKU CO., Ltd), and then mixed using a henschel mixer (available from NIPPON COKE & ENGINEERING CO., LTD.). The resultant was fired at 1,200° C., ground using the stamp mill again, and then finely ground using a planetary ball mill (P-5, available from Fritsch) with 5 mm zirconia beads to produce the glaze frit.

Production Example 2

<Production Black Colorant>
$Cr_2O_3$ (110 g), MnO (270 g), $Fe_2O_3$ (112 g), and $Co_2O_3$ (508 g) were combined as inorganic pigment components, ground using the stamp mill, and then mixed using the henschel mixer. The resultant was fired at 1,100° C., and then ground using the stamp mill again to produce a black inorganic colorant.

The resultant black inorganic colorant (300 g) and the glaze fit (500 g) were mixed together using the henschel mixer, fired at 750° C., ground using the stamp mill again, and then finely ground using a planetary ball mill (P-5, available from Fritsch) with 5 mm zirconia beads to produce a black colorant.

Production Example 3

<Production of Yellow Colorant>
A yellow colorant was produced in the same manner as in the Production Example 2, except that the inorganic pigment components were changed to CuO (10 g), ZnO (190 g), and $Sb_2O_3$ (800 g).

Production Example 4

<Production of Magenta Colorant>
A magenta colorant was produced in the same manner as in the Production Example 2, except that the inorganic pigment components were changed to $Fe_2O_3$ (160 g), NiO (40 g), CuO (40 g), and $Au_2O$ (760 g).

Production Example 5

<Production of Cyan Colorant>
A cyan colorant was produced in the same manner as in the Production Example 2, except that the inorganic pigment components were changed to $Cr_2O_3$ (170 g), $Fe_2O_3$ (10 g), $Co_2O_3$ (690 g), and ZnO (130 g).

Production Example 6

<Production of Aqueous Ink>
Aqueous inks were produced from the above colorants by mixing raw materials described below.
Each of the resultant colorants . . . 100 parts by mass
Polycarboxylic acid surfactant (SANSPEARL (registered trademark) PS-2, available from Sanyo Chemical Industries, Ltd.) . . . 3 parts by mass
Polyethylene glycol 400 (PEG #400, available from NOF CORPORATION) . . . 10 parts by mass
Pure water . . . 20 parts by mass
Viscosities of the resultant aqueous inks were found to be 20 Pa·s (Aqueous ink Bk (black)), 50 Pa·s (Aqueous ink Y (yellow)), 10 Pa·s (Aqueous ink M (magenta)), and 90 Pa·s (Aqueous ink C (cyan)).
Note that, the viscosities were measured under an environment of 25° C. using the rotational viscometer (VISCOMATE VM-150III, available from Toki Sangyo Co., Ltd).

Production Example 7

<Production of Oily Ink>
Oily inks were produced from the above colorants by mixing raw materials described below.
Each of the resultant colorants . . . 100 parts by mass
Ethyl cellulose (ETHOCEL (registered trademark) . . . 10, available from Dow Chemical Company) . . . 10 parts by mass
Butanol . . . 90 parts by mass
Viscosities of the resultant aqueous inks were found to be 8.0 Pa·s (Oily ink Bk (black)), 15 Pa·s (Oily ink Y (yellow)), 2.4 Pa·s (Oily ink M (magenta)), and 100 Pa·s (Oily ink C (cyan)).

Note that, the viscosities were measured under an environment of 25° C. using the rotational viscometer (VISCOMATE VM-150III, available from Toki Sangyo Co., Ltd).

Example 1

Each of the produced inks was applied using a rubber roller onto a slide glass (MICROSLIDE GLASS S7213, available from Matsunami Glass Ind., Ltd., the transmittance of light at a wavelength of 532 nm: 99%) serving as the ink bearer to form a layer having an average thickness of 25 μm. Then, the surface on which the ink had been applied was arranged to be opposed to an attachment target described below. Thus, the ink bearer was placed so that the ink bearer was able to be irradiated with the laser beam vertically from a surface opposite to the surface on which the ink had been applied.

<Attachment Target>

A tile (RS252/1001, available from LIXIL corporation, size: 150 mm×150 mm×9 mm) was used as the attachment target. A gap between the tile and the surface on which the ink had been applied was set to be 1.5 mm.

<Image Formation>

Each of the resultant inks was flown onto the tile under the conditions described below to form an ink image.

CPA-2001 (available from CLARK-MXR) was used as the laser light source to generate a laser beam having a wavelength of 1,064 nm, a beam diameter of 1.25 mm×1.23 mm, a pulse width of 2 nanoseconds, and a pulse frequency of 20 Hz. A condenser lens (YAG laser condenser lens, available from Sigma Koki Co., Ltd.) serving as the beam diameter changing member was irradiated with the generated 1 pulse of laser beam, so that the ink would be irradiated with a laser beam having a beam diameter of 400 μm×400 μm. A KTP crystal (available from CESTECH) used as the beam wavelength changing element was irradiated with the laser beam that went through the beam diameter changing member, to change the wavelength from 1,064 nm to 532 nm. Next, the resultant laser beam was let through the energy adjusting filter (ND filter, available from Sigma Koki Co., Ltd.), so that the ink would be irradiated with a laser output of 0.5 mJ/dot.

<Firing>

After forming the ink image on the tile, the ink image formed on the tile was fired using an electric furnace for ceramics by heating to 800° C. at a temperature gradient of 100° C./1 hour, keeping at 800° C. for 1 hour, and then naturally cooling. Thus, image formed objects 1 were produced.

The resultant inks 1 and the image formed objects 1 of Example 1 were evaluated for various properties as described below. The results are presented in Tables 1-1 and 1-2.

<Evaluation of Sedimentability of Inorganic Pigment>

Each of the produced inks 1 (30 cm³) was placed into a screw vial (volume: 50 cm³). The screw vial was capped and then left to stand for 1 hour under an environment of 25° C. and 50% RH. Then, the inorganic pigment was visually evaluated for sedimentability according to criteria described below. In this evaluation, "Good" represents a non-problematic level for practical use.

[Evaluation Criteria]

Good: Sedimentation of the inorganic pigment was not observed.

Poor: The inorganic pigment was sedimented and separated from supernatant.

<Evaluation of Bleeding>

The ink image on each of the resultant image formed objects 1 was visually evaluated for the presence or absence of the bleeding phenomenon according to criteria described below. In this evaluation, "Good" or "Fair" represents a non-problematic level for practical use.

[Evaluation Criteria]

Good: The image was kept sharp without bleeding even after the image formation and the firing.

Fair: The bleeding phenomenon occurred slightly after the image formation and the firing.

Poor: The image was not kept due to serious bleeding after the image formation and the firing.

<Evaluation of Scratching Resistance>

The ink image on each of the resultant image formed objects 1 was evaluated for a scratching resistance according to JIS K 5600-5-4 (ISO/DIN 15184). In this evaluation, "Very good," "Good," or "Fair" represents a non-problematic level for practical use.

[Evaluation Criteria]

Very good: There was no scratch at the hardness of 2H or more.

Good: There was no scratch at the hardness of H.

Fair: There was no scratch at the hardness of HB.

Poor: There was any scratch at the hardness of less than HB.

<Evaluation of Peeling Resistance>

A piece of tape (CELLOTAPE (registered trademark), available from NICHIBAN Co., Ltd.) was adhered by rubbing with an eraser (MONO (registered trademark) eraser, available from Tombow Pencil Co., Ltd.) onto a cured film including the ink image on each of the resultant image formed objects 1. The piece of tape was peeled. Then, the cured film was visually observed to evaluate for peeling resistance according to criteria described below. In this evaluation, "Good" represents a non-problematic level for practical use.

[Evaluation Criteria]

Good: The cured film was not peeled from the heat resistant substrate.

Fair: The cured film was cracked or there were bubbles between the cured film and the heat resistant substrate.

Poor: The cured film was completely peeled.

<Evaluation of Dot Graininess>

The ink image on each of the resultant image formed objects 1 was visually evaluated for dot graininess according to criteria described below. In this evaluation, "Very good" or "Good" represents a non-problematic level for practical use.

[Evaluation Criteria]

Very good: Circular dots were stably formed.

Good: There was fine ink scattering around dots.

Fair: There was significant ink scattering around dots.

Poor: Dots were not reproduced.

<Evaluation of Stability of Ink Attached Amount>

Stability of an ink attached amount was visually evaluated after continuous image formation for 1 hour according to criteria described below. In this evaluation, "Good" represents a non-problematic level for practical use.

[Evaluation Criteria]

Good: The ink attached amount was stable and the ink image was clear.

Fair: The ink attached amount was unstable and the ink image was unclear.

Poor: The ink was not able to be flown.

<Comprehensive Evaluation>

Based on the results of the evaluations of sedimentability of inorganic pigment, bleeding, scratching resistance, peeling resistance, dot graininess, and stability of ink attached amount, a comprehensive evaluation was performed according to criteria described below.
[Evaluation Criteria]
Good: All "Good" or higher rating.
Fair: One or more Fair or lower rating (Fair or Poor).

Example 2

Each of image formed objects of Example 2 was produced and evaluated in the same manner as in Example 1, except that a spiral phase plate (VOLTEX PHASE PLATE, available from Luminex Tracing, Inc.) serving as the optical vortex converting portion was placed between the beam wavelength changing unit 4 and the energy adjusting filter 6 on the light path of the laser beam 11 in FIG. 4A to convert the laser beam to the optical vortex laser beam. The results are presented in Tables 1-1 and 1-2.

Comparative Example 1

Each of image formed objects of Comparative Example 1 was attempted to be produced in the same manner as in Example 1, except that the image forming apparatus having the image forming unit of the present disclosure was changed to an image forming apparatus having a nozzle diameter-modified product of an inkjet head (MH2820, available from Ricoh Company, Ltd.) and image formation was performed by ejecting the ink under the following ejection conditions. However, the ink had too high viscosity to be ejected.
[Ejection Conditions]
Mode: Laminated piezoelectric push mode
Nozzle diameter: 30 μm
Driving frequency: 10 kHz
Applied voltage: 20 V Comparative Example 2

Each of image formed objects of Comparative Example 2 was produced and evaluated in the same manner as in Example 1, except that the ink was diluted with the dispersion medium until the ink was able to be ejected under the ejection conditions of Comparative Example 1, then the image forming apparatus having the image forming unit of the present disclosure was changed to the image forming apparatus having the inkjet head, and image formation was performed by ejecting the ink under the ejection conditions. The results are presented in Tables 1-1 and 1-2.

Note that, viscosities of the inks which had been diluted until the inks were able to be ejected were 30 mPa·s or lower. The viscosities were measured under an environment of 25° C. using the rotational viscometer (VISCOMATE VM-150III, available from Toki Sangyo Co., Ltd).

TABLE 1-1

| | | | Volume average particle | Evaluation of ink | | |
| | Image forming unit | Kind of ink | diameter of colorant (μm) | Viscosity (Pa · s) | Sedimentability of pigment |
|---|---|---|---|---|---|
| Ex. 1 | Laser | Aqueous Bk | 10 | 20 | Good |
| | | Aqueous Y | 5 | 50 | Good |
| | | Aqueous M | 20 | 10 | Good |
| | | Aqueous C | 1 | 90 | Good |
| | | Oily Bk | 10 | 8 | Good |
| | | Oily Y | 5 | 15 | Good |
| | | Oily M | 20 | 2.4 | Good |
| | | Oily C | 1 | 100 | Good |
| Ex. 2 | Optical vortex laser | Aqueous Bk | 10 | 20 | Good |
| | | Aqueous Y | 5 | 50 | Good |
| | | Aqueous M | 20 | 10 | Good |
| | | Aqueous C | 1 | 90 | Good |
| | | Oily Bk | 10 | 8 | Good |
| | | Oily Y | 5 | 15 | Good |
| | | Oily M | 20 | 2.4 | Good |
| | | Oily C | 1 | 100 | Good |
| Comp. Ex. 2 | Inkjet | Aqueous Bk | 10 | 0.03 | Poor |
| | | Aqueous Y | 5 | 0.03 | Poor |
| | | Aqueous M | 20 | 0.03 | Poor |
| | | Aqueous C | 1 | 0.03 | Poor |
| | | Oily Bk | 10 | 0.03 | Poor |
| | | Oily Y | 5 | 0.03 | Poor |
| | | Oily M | 20 | 0.03 | Poor |
| | | Oily C | 1 | 0.03 | Poor |

TABLE 1-2

| | Evaluation of sintered ink image | | | | | |
| | Bleeding phenomenon | Scratching resistance | Peeling resistance | Dot graininess | Stability of ink attached amount | Comprehensive Evaluation |
|---|---|---|---|---|---|---|
| Ex. 1 | Good | Very good | Good | Good | Good | Good |
| | Good | Very good | Good | Good | Good | Good |
| | Good | Very good | Good | Good | Good | Good |
| | Good | Very good | Good | Good | Good | Good |
| | Good | Good | Good | Good | Good | Good |
| | Good | Good | Good | Good | Good | Good |
| | Good | Good | Good | Good | Good | Good |
| | Good | Good | Good | Good | Good | Good |
| Ex. 2 | Good | Very good | Good | Very good | Good | Good |
| | Good | Very good | Good | Very good | Good | Good |
| | Good | Very good | Good | Very good | Good | Good |
| | Good | Very good | Good | Very good | Good | Good |
| | Good | Good | Good | Very good | Good | Good |
| | Good | Good | Good | Very good | Good | Good |
| | Good | Good | Good | Very good | Good | Good |
| | Good | Good | Good | Very good | Good | Good |

TABLE 1-2-continued

| | Evaluation of sintered ink image | | | | | |
|---|---|---|---|---|---|---|
| | Bleeding phenomenon | Scratching resistance | Peeling resistance | Dot graininess | Stability of ink attached amount | Comprehensive Evaluation |
| Comp. Ex. 2 | Fair | Good | Good | Good | Fair | Poor |
| | Fair | Good | Good | Good | Fair | Poor |
| | Fair | Good | Good | Fair | Poor | Poor |
| | Fair | Good | Good | Fair | Good | Poor |
| | Fair | Good | Good | Good | Fair | Poor |
| | Fair | Good | Good | Good | Fair | Poor |
| | Fair | Good | Good | Fair | Poor | Poor |
| | Fair | Good | Good | Fair | Good | Poor |

It can be seen from the results in Tables 1-1 and 1-2 that, in Comparative Example 2, the inorganic pigments included in the produced inks sediment. Therefore, it is believed that stable image forming is difficult unless taking measures to prevent the sedimentation.

Aspects of the present disclosure are as follows, for example.

<1> A method for forming an image, the method including forming an image by irradiating an ink that absorbs light with a laser beam that has a wavelength corresponding to a light absorption wavelength of the ink to fly the ink by an energy of the laser beam in a direction in which the laser beam is emitted, to attach the ink on an attachment target.

<2> The method for forming an image according to <1>, wherein the ink has a viscosity of 2 Pa·s or higher but 100 Pa·s or lower.

<3> The method for forming an image according to <1> or <2>, wherein the laser beam includes an optical vortex laser beam.

<4> The method for forming an image according to any one of <1> to <3>, wherein the laser beam has a pulse frequency of 10 Hz or greater but 200 Hz or less.

<5> The method for forming an image according to any one of <1> to <4>, wherein the method further includes firing the ink attached on the attachment target.

<6> The method for forming an image according to <5>, wherein the attachment target includes a heat resistant substrate.

<7> The method for forming an image according to <6>, wherein the heat resistant substrate includes at least one selected from the group consisting of tiles, glass, unglazed pottery and porcelain, pottery and porcelain, and enamel.

<8> The method for forming an image according to any one of <1> to <7>, wherein the ink includes at least a colorant; and wherein the colorant includes at least one selected from the group consisting of an inorganic pigment and a glaze fit.

<9> The method for forming an image according to <8> or <9>, wherein primary particles of the inorganic pigment and the glaze fit have a volume average particle diameter of 0.1 μm or greater but 100 μm or less.

<10> The method for forming an image according to <8> or <9>, wherein a mass ratio of the inorganic pigment to the glaze frit (inorganic pigment/glaze frit) is 2/8 or higher but 6/4 or lower.

<11> The method for forming an image according to any one of <8> to <10>, wherein the ink further includes an organic binder.

<12> The method for forming an image according to <11>, wherein the organic binder is included in an amount of 0.1 parts by mass or greater but 10 parts by mass or less relative to 100 parts by mass of a total mass of the inorganic pigment and the glaze frit.

<13> An image forming apparatus including:
an ink that absorbs light; and
an image forming unit configured to irradiate the ink with a laser beam that has a wavelength corresponding to a light absorption wavelength of the ink to fly the ink by an energy of the laser beam in a direction in which the laser beam is emitted, to attach the ink on an attachment target.

<14> The image forming apparatus according to <13>, wherein the ink has a viscosity of 2 Pa·s or higher but 100 Pa·s or lower.

<15> The image forming apparatus according to <13> or <14>, wherein the image forming unit is configured to irradiate the ink borne on one surface of an ink bearer transparent to the light with the laser beam from other surface of the ink bearer.

<16> The image forming apparatus according to any one of <13> to <15>, wherein the image forming unit further includes an optical vortex converting portion configured to convert the laser beam to an optical vortex laser beam.

<17> The image forming apparatus according to any one of <13> to <16>, wherein the image forming apparatus further includes a firing unit configured to fire the ink attached on the attachment target.

<18> The image forming apparatus according to <17>, wherein the attachment target includes a heat resistant substrate.

<19> An ink for laser emission recording,
wherein the ink absorbs light;
wherein the ink is configured to fly in response to irradiation with a laser beam that has a wavelength corresponding to a wavelength of the light; and
wherein the ink has a viscosity of 2 Pa·s or higher but 100 Pa·s or lower.

<20> A method for producing an image formed object, producing the image formed object including an image, which is formed by the method for forming an image according to any one of <1> to <12>, on a surface of the attachment target.

According to the method for forming an image according to any one of <1> to <12>, the image forming apparatus according to any one of <13> to <18>, the ink for laser emission recording according to <19>, and the method for producing an image formed object according to <20>, the above existing problems can be solved the above objects of the present disclosure can be achieved.

What is claimed is:

1. A method for forming an image, the method comprising forming an image by irradiating an ink that absorbs light with a laser beam that has a wavelength corresponding to a light absorption wavelength of the ink to fly the ink by an energy of the laser beam in a direction in which the laser beam is emitted, to attach the ink on an attachment target;
wherein the ink has a viscosity of 2 Pa·s to 100 Pa·s, and
wherein the laser beam comprises an optical vortex laser beam.

2. The method for forming an image according to claim 1, wherein the method further comprises firing the ink attached on the attachment target.

3. The method for forming an image according to claim 2, wherein the attachment target comprises a heat resistant substrate.

4. The method for forming an image according to claim 3, wherein the heat resistant substrate comprises at least one selected from the group consisting of tiles, glass, unglazed pottery and porcelain, pottery and porcelain, and enamel.

5. The method for forming an image according to claim 1, wherein the ink comprises at least a colorant; and
wherein the colorant comprises at least one selected from the group consisting of an inorganic pigment and a glaze fit.

6. A method for producing an image formed object, the method comprising producing the image formed object comprising an image, which is formed by the method for forming an image according to claim 1, on a surface of the attachment target.

7. An image forming apparatus comprising:
an ink that absorbs light, wherein the ink has a viscosity of 2 Pa·s to 100 Pa·s; and
an image forming unit configured to irradiate the ink with a laser beam that has a wavelength corresponding to a light absorption wavelength of the ink to fly the ink by an energy of the laser beam in a direction in which the laser beam is emitted, to attach the ink on an attachment target,
wherein the image forming unit comprises an optical vortex converting portion configured to convert the laser beam to an optical vortex laser beam.

8. The image forming apparatus according to claim 7, wherein the image forming unit is configured to irradiate the ink borne on one surface of an ink bearer transparent to the light with the laser beam from other surface of the ink bearer.

9. The image forming apparatus according to claim 7, wherein the image forming apparatus further comprises a firing unit configured to fire the ink attached on the attachment target.

10. The image forming apparatus according to claim 9, wherein the attachment target comprises a heat resistant substrate.

11. An ink for laser emission recording,
wherein the ink absorbs light;
wherein the ink is configured to fly in response to irradiation with a laser beam that has a wavelength corresponding to a wavelength of the light; and
wherein the ink has a viscosity of 2 Pa·s or higher but 100 Pa·s or lower.

* * * * *